United States Patent [19]

Tenney

[11] 4,259,840
[45] Apr. 7, 1981

[54] FLUIDIC WASTE GATE
[75] Inventor: Stephen M. Tenney, Rockville, Md.
[73] Assignee: The United States of America as represented by the Secretary of the Army, Washington, D.C.
[21] Appl. No.: 87,891
[22] Filed: Oct. 24, 1979
[51] Int. Cl.³ ............................................. F02B 37/12
[52] U.S. Cl. ........................................ 60/602; 60/611; 415/145; 415/148
[58] Field of Search ................ 60/600, 601, 602, 603, 60/611; 137/809, 810, 811, 812; 415/144, 145, 148, 144 R

[56] References Cited
U.S. PATENT DOCUMENTS

| | | | |
|---|---|---|---|
| 3,373,759 | 3/1968 | Adams | 137/809 |
| 3,470,894 | 10/1969 | Rimmer | 137/809 |
| 3,564,844 | 2/1971 | Rimmer | 137/809 |
| 3,931,712 | 1/1976 | Keller | 60/602 |
| 4,005,578 | 2/1977 | McIherney | 60/602 |

Primary Examiner—Michael Koczo, Jr.
Attorney, Agent, or Firm—Nathan Edelberg; Robert P. Gibson; Saul Elbaum

[57] ABSTRACT

In the combination of an internal combustion engine, a turbocharger and a waste gate, the improvement is the waste gate which includes a fluidic device having its inlet and outlet connected in parallel with the turbine of the turbocharger and a biasing port responsive to the output of the turbocharger to proportion the fluid flow from the inlet to the outlet between two parallel fluidic paths having a high and low flow resistance respectively. The fluidic device is a fluid amplifier providing radial and tangential flow to a vortex valve to produce the low and high resistance fluidic paths respectively. Alternatively, the fluidic device could be in series with the turbocharger to backpressure the compressor of the turbocharger.

7 Claims, 4 Drawing Figures

FLUIDIC WASTE GATE

RIGHTS OF THE GOVERNMENT

The invention described herein may be manufactured, used, and licensed by or for the United States Government for governmental purposes without the payment to me of any royalty thereon.

BACKGROUND OF THE INVENTION

The present invention relates generally to turbocharged internal combustion engines and more specifically to an improved waste gate to be used in combination with a turbocharged internal combustion engine.

A common technique by which the output power from an internal combustion engine can be increased is the exhaust driven turbocharger. As economy becomes more important and smaller displacement engines are used, in order to provide more power when needed, turbocharges can be applied to an increasing number of vechicles. This is true for spark ignition engines as well as diesel engines. The diesel engine responds particularly well to turbocharging and up to now has been the largest user of turbochargers in trucks, tractors, heavy equipment and some automobiles.

A simple explanation of the function of a turbocharger showing the waste gate is illustrated in FIG. 1. The intake to the system is through a fuel control device 10, for example, a carburetor, to a compressor 12 of the turbocharger 14. The fuel/air mixture from compressor 12 is ducted to the intake valve 16 of cylinder 18 of the internal combustion engine. The exhaust from cylinder 18 exits exhaust valve 22 and drives turbine 24 of turbocharger 14 and is exhausted through exhaust 26. Connected in parallel with turbine 24 is waste valve 28, having inlet 30 and outlet 32. Control inlet 34 of waste gate 28 is connected between the output of compressor 12 and the intake valve 16 of cylinder 18.

The exhaust from the engine is passed through the turbine 24 which drives the compressor 12 which charges or pressurizes the combustion chamber of cylinder 18. In this manner, the volumetric displacement of the engine is effectively increased. The pressure applied to the engine intake is known as boost. The boost available is dependent on engine speed and load and must be regulated to some acceptable value. Since it is desirable to apply boost at low engine speed, the by-pass valve or waste gate 28 is utilized to reduce flow through the turbocharger at high engine speed or when sufficient boost is present.

The valve 28 must handle exhaust gases at temperatures from 1400 to 1700° F. Waste gates or valves currently in use are mechanical, either spring loaded blow-off valves which are crude in their control of boost or diaphragm actuated valves which control boost more accurately. A typical example are U.S. Pat. Nos. 3,931,712 and 4,005,578. In either case these valves must be carefully made to handle the high temperature and vibrations present in the engine exhaust. This results in a valve which is very expensive and exhibits poor reliability due to the severe conditions in which it must operate. Failure of a waste gate can result in a damaged engine through burned pistons or destruction of the turbocharger itself due to overspeed.

Thus, there exists a need for a valve or waste gate to be used with a turbocharged engine having high reliability and longer life than those of the prior art. Although the system described in U.S. Pat. No. 3,931,712 suggests replacing mechanical pressure regulator 40 with a fluidic or electronic device, the output of the regulator is still used to drive hydraulic actuator 30 which controls a butterfly waste gate or by-pass valve 25. Thus, the total number of movable parts and elements which are capable of failure have not been optimized, even in the aforementioned U.S. patents.

SUMMARY OF THE INVENTION

An object of the present invention is to provide a fluidic waste gate for a turbocharged internal combustion engine including no movable parts.

Another object of the present invention is to provide a waste gate for a turbocharged internal combustion engine which has better reliability than the prior waste gates.

A further object of the present invention is to increase the longevity of a turbocharged internal combustion engine by using fluidic devices with no movable parts.

These and other objects of the invention are obtained by using a fluidic waste gate or by-pass valve in parallel with the turbine of the turbocharger which has no movable parts. The waste gate has two parallel fluidic paths between its inlet and outlet which are connected across the turbocharger. The first fluidic path creates a high resistance path between the inlet and outlet of the fluidic device and the second fluidic path creates a low resistance path between the inlet and outlet of the fluidic device. A biasing port of the fluidic device is responsive to the output of the compressor and determines the overall resistance between the inlet and outlet of the fluidic device by proportioning the fluid flow from the inlet to the outlet between the first and second fluidic paths. The bias port which senses the boost is connected between the output of the compressor and the inlet to the internal combustion engine. The fluidic device includes a fluidic amplifier and a vortex valve at the outlet of the fluidic amplifier. The fluidic amplifier includes a first path producing tangential flow to the vortex valve to define therewith the first fluidic path of high resistance and a second fluidic path producing radial flow to the vortex valve to therewith define the second fluidic path of flow resistance.

The fluidic device may alternatively be used in series with the turbocharger and the internal combustion engine instead of as a waste gate to also control the effect of the turbocharger. The inlet and outlet of the fluidic device may be connected in series between the compressor and intake valve of the internal combustion engine or between the exhaust valve of the internal combustion engine and the turbine of the turbocharger. The biasing port may be connected to the fluid path between the compressor and the intake valve to sense the boost. The fluidic valve would be designed to control the overall fluid resistance in the paths between the compressor and the turbine to control the operation of the compressor and its boost by effectively backpressuring the compressor or the engine respectively.

Other objects, advantages and novel features of the present invention will become apparent from the following detailed description of the invention considered in conjunction with the accompanying drawings.

DESCRIPTION OF PREFERRED EMBODIMENTS

Figure 1:
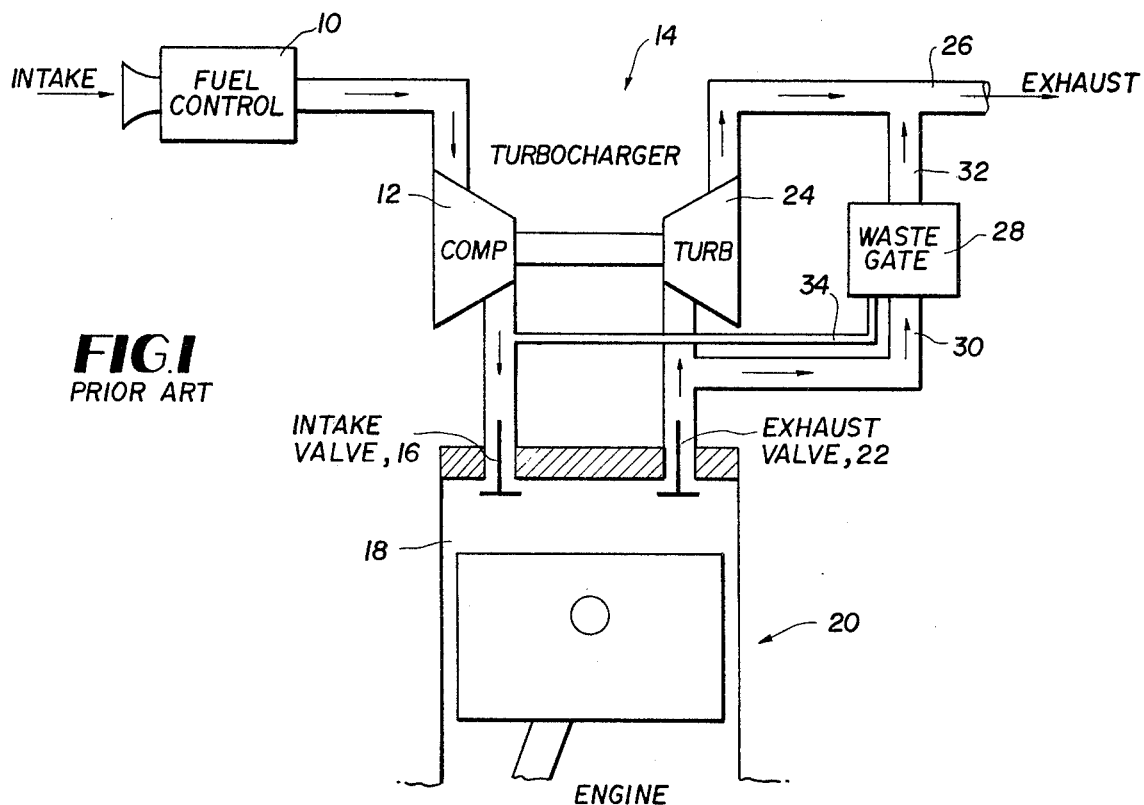
FIG. 1 is a block diagram of a turbocharged internal combustion engine of the prior art including a waste gate.
Figure 2:
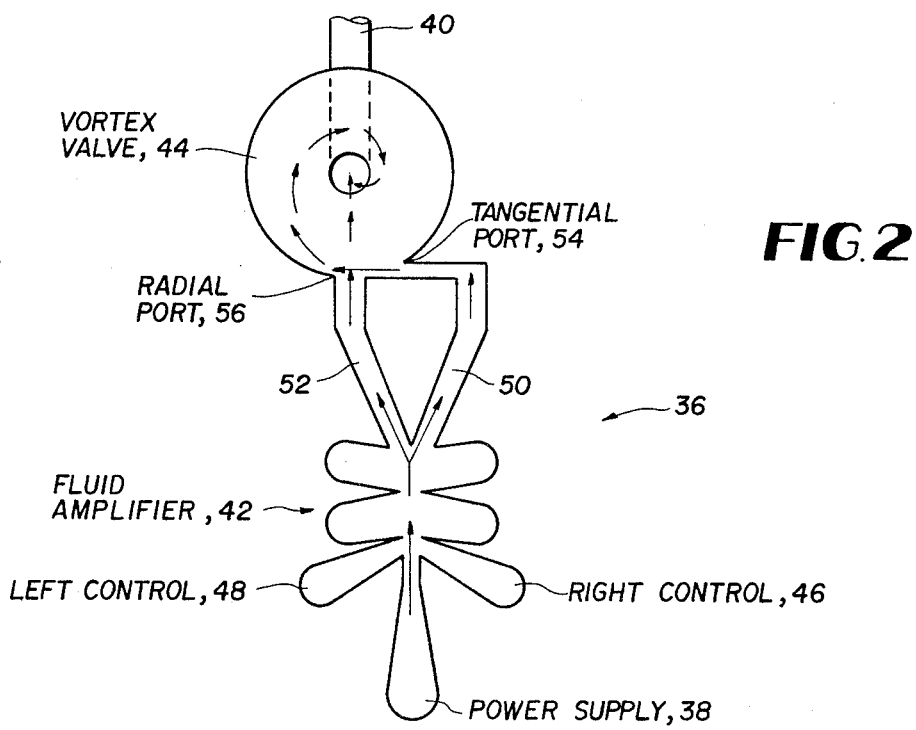
FIG. 2 is a diagram of a fluidic valve for use as a waste gate incorporating the principles for the present invention.

The present invention is an improvement over the prior art by incorporating a fluidic waste gate for the mechanical waste gate 28 as illustrated in FIG. 1. The fluidic waste gate includes no mechanical movable parts, and consequently, the longevity of the device is increased over that of the prior art waste gates. The preferred embodiment of the waste gate is illustrated in FIG. 2 as fluidic device 36 having a power supply inlet 38 and an outlet 40. The fluidic device is comprised of two sections, namely a fluid amplifier 42 and a vortex valve 44. The fluid entering the fluid amplifier 42 through inlet 38 is directed under the control of biasing ports 46 and 48 to be proportioned between flow paths 50 and 52. Flow path 50 is connected to the vortex valve 44 at tangential port 54 to produce a tangential flow to the outlet 40 of the vortex valve 44 and thereby producing a high resistance fluidic path between the inlet 38 and the outlet 40. Flow path 52 is connected to the vortex valve 44 at a radial port 56 to produce radial flow to the outlet 40 of the vortex valve to define therewith a low resistance path between the inlet 38 and the outlet 40. The overall resistance between the inlet 38 and the outlet 40 of fluidic device 36 is a function of the proportioning of the fluid flow between the fluidic paths 50 and 52.

The fluidic device 36 is basically a variable resistance fluidic device having no movable parts. It could be incorporated in the system FIG. 1 for waste gate 28 having the inlet 38 connected to fluid path 30 and the outlet 40 connected at fluid path 32. The biasing port 46 would be connected at 34 to sense the speed of the engine by monitoring the pressure at the output of compressor 12 or at the intake valve 16 of the combustion chamber 18. The other biasing port 48 may be connected to atmosphere or a fixed source of pressure. The relationship of the pressures at control ports 46 and 48 are designed such that almost all if not the majority of the flow through the fluidic device 36 is through the high resistance path 50. Thus, the fluidic device 36 has a high resistance state compared to the turbine 24 and the fluid flow from the exhaust valve 22 of the combustion chamber 18 is through turbine 24. This allows all of the exhaust pressure to traverse the turbine 24 and maximize the efficiency of the compressor 12 to boost the engine. As the boost begins to increase, the pressure at biasing control port 46 increases to divert a portion of the fluid at inlet 38 to the low resistance path 52. This reduces the overall resistance of the fluidic device 36 between the inlet 38 and outlet 40 and a portion of the exhaust fluid from the exhaust valve 22 begins to be diverted or by-passes the turbine 24 and thereby limits the boost.

Thus, it can be seen that the fluidic device 36 solves the problems of the moving part valves in high temperature exhaust gases of the prior art. There are no valves to stick, valve seats to leak or to wear out. With the elimination of movable parts, the reliability and longevity of the device is greatly improved and thus decreases the probability of destruction of the turbocharger or the internal combustion engine. The prior art waste gates or by-pass valves tend to stick if they are not called upon to by-pass flow regularly. If the engine is driven easily for an extended period of time, the valves can stick due to particulate matter in the exhaust. When the waste gate is needed, it will not respond, possibly causing damage to the engine of the turbocharger. Also, valve chatter, due to engine vibration, can destroy the mechanical by-pass gate.

Figure 3:
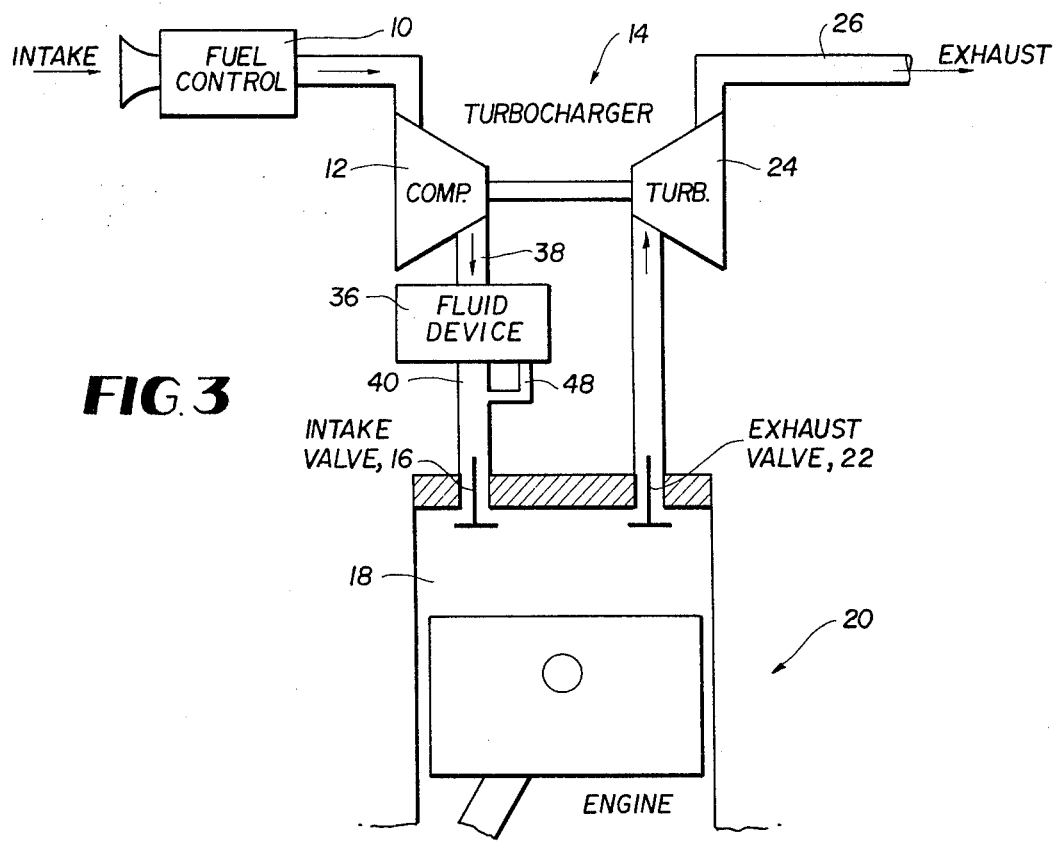
FIG. 3 is a block diagram illustrating the incorporation of the fluidic valve of FIG. 2 in series with the compressor and intake valve according to the principles of the present invention.
Figure 4:
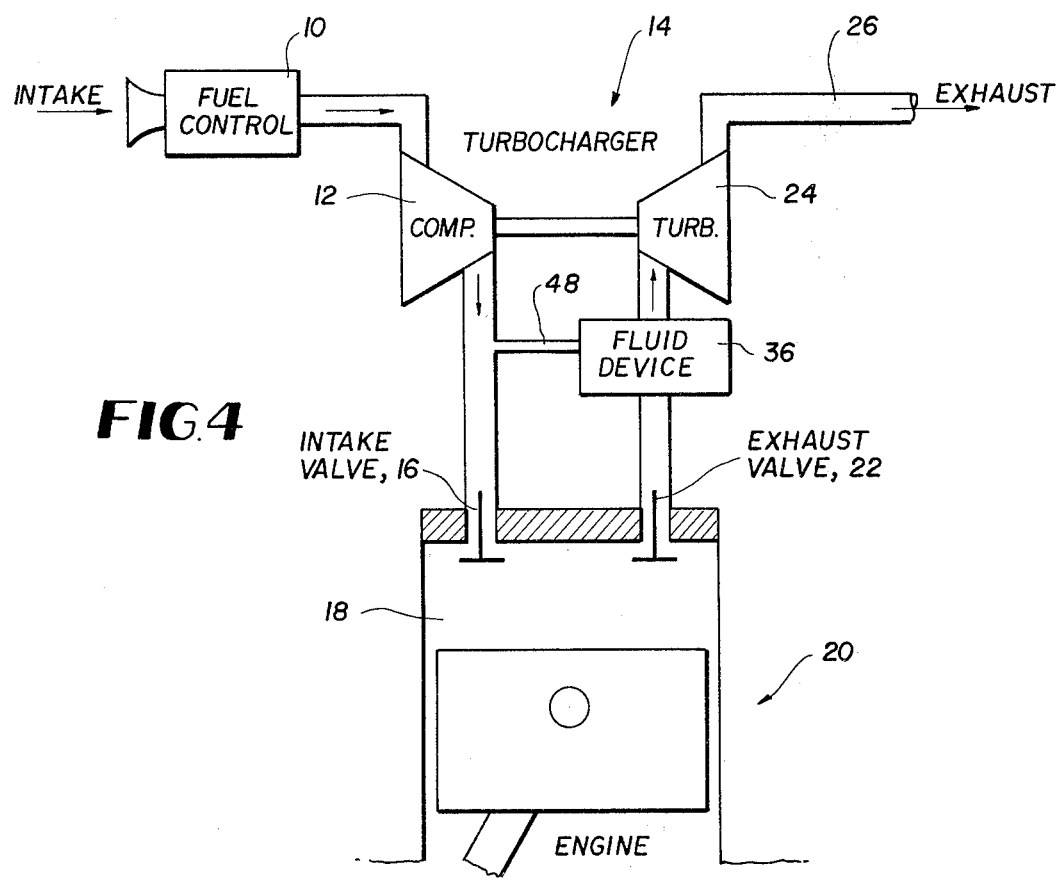
FIG. 4 is a block diagram illustrating the fluidic valve of FIG. 2 incorporated in series between the exhaust valve and the turbine according to the principles of the present invention.

The fluidic device 36 can be used with a turbocharged engine to control the turbocharger as a function of engine speed and load other than in the waste gate configuration of FIG. 1. As illustrated in FIGS. 3 and 4, the fluidic device 36 may be connected in series with the turbocharger, either in line between compressor 12 and the intake valve 16 as illustrated in FIG. 13 or in line between the exhaust valve 22 and the turbine 24 as illustrated in FIG. 4. The biasing port 48 is connected in both examples to the intake valve 16 of the engine to sense the applied boost. Since fluidic device 36 is a variable resistor, it is connected to operate in reverse manner when it is connected as a waste gate. To be more specific, the left port 48 is connected to sense the boost and port 46 is connected to an appropriate reference source such that at low engine speeds, all or at least the majority of the flow is through the low resistance fluid path 52. This allows the maximum efficiency of the boost from the output of the compressor to the intake of the combustion chamber. As the speed of the engine increases, the pressure at bias port 48 directs the fluid flow to be proportioned between low resistance path 52 and high resistance path 50. With the increase of the overall resistance of the fluidic device 36, the compressor 12 is back-pressured to slow down and thereby limit its boost. The same effect is achieved whether the fluidic device 36 is between the compressor and the intake valve as illustrated in FIG. 3, or between the exhaust valve and the turbine as illustrated in FIG. 4. The second concept of the use of the fluidic device having a variable resistance which is a function of the engine speed and load in series offers the advantages and novel features of the present invention as does the use of device 36 as a waste gate. The only possible disadvantage, is that the second concept does not offer the degree of control over the turbocharger as does the waste gate configuration.

From the preceeding description of the preferred embodiment, it is evident that the objects of the invention are attained in that a fluidic device has been incorporated into a turbocharged engine to extend longevity of the system. I wish it to be understood that I do not desire to be limited to the exact details of the construction shown and described, for obvious modifications can be made by persons skilled in the art.

What is claimed:

1. In the combination of an internal combustion engine, a turbocharger which includes a compressor on the inlet of a combustion chamber of the engine and a turbine on the outlet of the combustion chamber, and a waste gate means in parallel with the turbine and responsive to the speed of the engine for adjusting the operation of the turbocharger by controlling fluid by-passing the turbine, the improvement being said waste gate means which comprises a fluidic device having an inlet connected to the input of the turbine, an outlet connected to the output of the turbine, a first fluidic path creating a high resistance path between said inlet and outlet, a second fluidic path creating a low resistance path between said inlet and outlet, and a bias port and fluidic path responsive to the speed and load of the engine to determine the overall resistance between the inlet and outlet ports by proportioning the fluid flow from the inlet to the outlet between said first and second fluidic paths.

2. The combination of claim 1 wherein said bias port is connected to the inlet of the combustion chamber to decrease the overall resistance of the fluidic device as the boost increases.

3. The combination of claim 1 wherein said fluidic device includes a fluidic amplifier and a vortex valve at the outlet of the fluidic amplifier, said fluidic amplifier includes a first path producing tangential flow to the vortex valve to define therewith said first fluidic path of high resistance and a second path producing radial flow to the vortex.

4. In the combination of an internal combustion engine, a turbocharger which includes a compressor on the inlet of combustion chamber of the internal combustion engine and a turbine on the outlet of said combustion chamber, and means responsive to the speed and load of the engine for adjusting the operation of the turbocharger, the improvement being said means which comprises a fluidic device having an inlet and an outlet connected in series between said turbocharger and said combustion chamber, a first fluidic path creating a high resistance path between said inlet and outlet, a second fluidic path creating a low resistance path between said inlet and outlet and a biasing port and fluidic path responsive to the speed and load of the engine to determine the overall resistance between said inlet and outlet by proportioning the fluid flow from said inlet to said outlet between said first and second fluidic paths.

5. The combination of claim 4 wherein said inlet of said fluidic device is connected to the outlet of said compressor, said outlet of said fluidic device is connected to the inlet of said combustion chamber and said bias port is connected to the inlet of said combustion chamber.

6. The combination of claim 4 wherein said inlet of said fluidic device is connected to the outlet of said combustion chamber, said outlet of said fluidic device is connected to the inlet of said turbine and said bias port is connected to the inlet of said combustion chamber.

7. The combination of claim 4 wherein said fluidic device includes a fluidic amplifier and a vortex valve at the outlet of the fluidic amplifier, said fluidic amplifier includes a first path producing tangential flow to the vortex valve to define therewith said first fluidic path of high resistance and a second path producing radial flow to the vortex valve to therewith define said second fluidic path of low resistance.

* * * * *